June 14, 1960      I. J. GLADNICK ET AL      2,941,121
GROUND DETECTOR CIRCUIT FOR THREE PHASE Y-CONNECTED LOAD
Filed Jan. 24, 1958

Inventors
Irvin J. Gladnick
Allan L. Halter
by Carl W. Laumann Jr.
Attorney

United States Patent Office 2,941,121
Patented June 14, 1960

2,941,121

GROUND DETECTOR CIRCUIT FOR THREE PHASE Y-CONNECTED LOAD

Irvin J. Gladnick, Wauwatosa, and Allan C. Halter, Milwaukee, Wis., assignors to Allis-Chalmers Manufacturing Company, Milwaukee, Wis.

Filed Jan. 24, 1958, Ser. No. 711,007

7 Claims. (Cl. 317—27)

This invention relates in general to protective devices for alternating current machines and in particular to a system for detecting a condition of phase unbalance in a three phase Y-connected load such as an induction motor of the wound rotor type.

The problem of protecting wound rotor induction motors from overload due to shorted windings or loss of a phase becomes more important as the size of the motor increases. The most desirable form of protection is responsive to a condition of phase unbalance since this results from a wide variety of fault conditions. Conventional protective systems do not give satisfactory protection of wound rotor motors due to the wide frequency variation and the extremely high voltages which are present in the secondary winding of a wound rotor motor.

Since most alternating current protective systems are frequency responsive, the protection offered is limited to a region close to the frequency at which the system is designed to operate. A circuit according to this invention provides protection for a wound rotor motor during the time of starting and up to the point where the slip frequency is approximately 40 percent of the supply frequency. This insures that the protection will be present during the time of starting the motor which is the most critical period. A conventional alternating current relay would fail at the point where the secondary or slip frequency is approximately 80 percent of the supply frequency. This is not adequate protection in view of the high voltages which are still present across the motor windings.

When a wound rotor induction motor is connected directly to the supply line a high induced voltage appears across the windings of the rotor as the motor picks up speed. This voltage causes extremely high currents to flow in the rotor winding unless additional resistance is inserted as a limiting factor. The conventional method of starting such a motor is to insert resistance in the rotor circuit and gradually decrease this resistance as the motor comes up to speed. Sufficient resistance is inserted in the rotor circuit to prevent the rotor windings from damage due to the normal starting currents but a fault, such as the loss of one phase, would result in high currents which tend to damage the rotor windings. It has been found that protection against the high currents caused by a fault is best provided by a device which detects a condition of unbalance between the currents flowing in the rotor windings. In this manner a fault condition is easily distinguished from a heavy starting load since the latter will not introduce an unbalance between the currents flowing in the rotor windings.

A convenient method of measuring the rotor winding currents and determining their phase relationship is to sense the voltage across the sections of resistance common to each rotor winding. Transformers which have a primary winding connected to be energized by the voltage across the resistance sections produce a signal voltage across their secondary windings which is responsive in phase and magnitude to the current in the rotor windings. Two of these signal voltages are combined to produce a resultant voltage. A measure of this resultant voltage is balanced against the third signal voltage to produce an output voltage only when the condition of phase unbalance exists.

Since the transformer which picks off the signal voltage is an alternating current device, the protective system loses its sensitivity as the slip frequency of the motor decreases. This is not a serious problem since the sensitivity is such as to afford protection for a slip frequency down to 40 percent of the supply frequency. At this point the chances of a fault condition damaging the motor are much more remote.

It is, therefore, an object of this invention to provide a simple, sensitive means for protecting a wound rotor induction motor.

Another object of this invention is to provide a device for detecting current unbalance in the legs of a three phase Y-connected load.

It is another object of this invention to provide a protective system for a wound rotor induction motor which protects the motor during the starting period.

Still another object of this invention is to provide a protective device for a wound rotor induction motor which provides protection for the windings over a wide range of current and frequency.

Other objects and advantages will be apparent from the following description considered in conjunction with the accompanying drawings in which.

Figure 1:
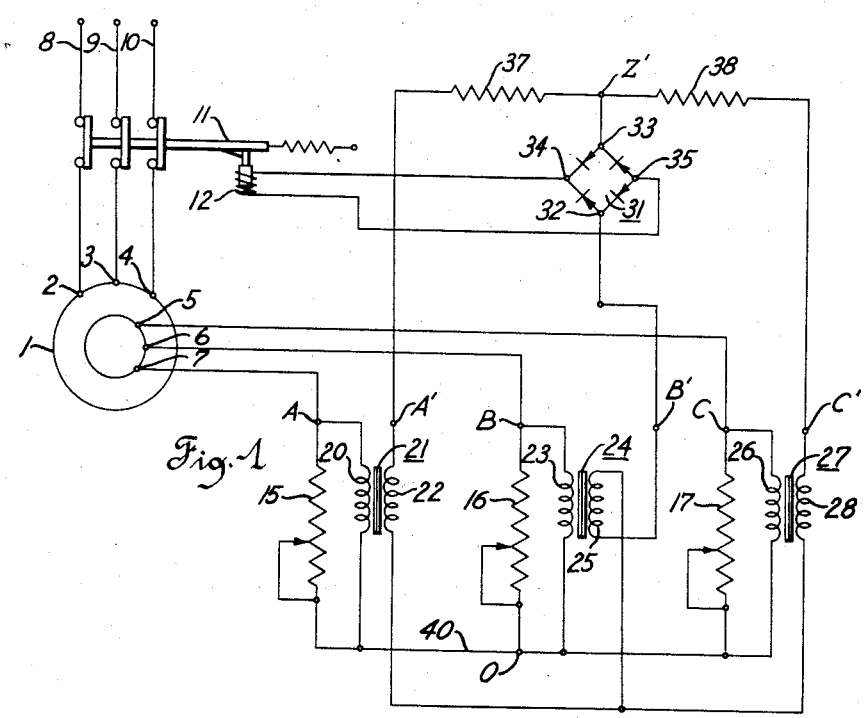
Fig. 1 is a schematic drawing of a circuit embodying the invention.

With reference to Fig. 1 a wound rotor motor 1 having connections 2, 3 and 4 to the primary winding and connections 5, 6 and 7 to the rotor or secondary winding is connected to a three phase circuit 8, 9 and 10 by means of a circuit breaker 11 having a trip coil 12. The terminals on the rotor winding are connected to a three element resistor having variable resistor sections 15, 16 and 17 which may be of the liquid rheostat type. This rheostat is connected in a Y-circuit relation with the rotor windings so that the resistance in series with the rotor windings may be increased sufficiently to limit the current flow in the rotor winding during the starting period. This method of limiting the starting current and governing the motor speed is well known in the art.

Each element of the rheostat has the primary winding of a transformer connected so as to be energized by the voltage across the rheostat element. For example, the primary winding 20 of transformer 21 is connected to be energized by the voltage across resistance 15. The voltage across resistor 16 energizes the primary winding 23 of transformer 24. In a similar manner, the voltage across resistance 17 energizes the primary winding 26 of transformer 27. The primary windings of the transformers are connected in what is essentially a Y-connection in parallel with the rheostat since each of the windings have one end connected to a common point which coincides with the point common to the variable resistances. In this manner each transformer has its primary winding energized by a measure of the voltage existing across one leg of the load circuit.

The secondary windings of the transformers are connected in a Y-relationship which differs slightly from the conventional connection. It will be noticed that each of the transformers has a secondary winding, one end of which is connected in common with one end of the secondary winding of the other transformers. Transformer 21 has a secondary winding 22 and transformer 27 has a secondary winding 28. These transformers have their secondary windings connected in the same sense, that is to say, the voltages across the secondary windings are in the same relation as the voltages across the primary windings. The secondary winding 25 of transformer 24 is connected in a reversed sense so that there is a 180 degrees change in phase between the voltage on the secondary side as compared to the voltage on the primary side.

The difference in potential between point B' and point Z' energizes full wave bridge rectifier 31 having alternating current input terminals 32 and 33 and direct current output terminals 34 and 35. The direct current output of bridge rectifier 31 energizes an electroresponsive device such as the circuit breaker trip coil 12. It will be seen that when the A.C. input voltage across the bridge rectifier 31 exceeds a predetermined value the resultant D.C. output will actuate the trip coil 12 to open breaker 11.

Connected to the end of secondary winding 22 is a resistor 37. A resistor 38 is connected to the end of secondary winding 28. Resistors 37 and 38 serve as a voltage divider so that point Z' represents one-half the vector difference between the potential of winding 22 and winding 28. This is better understood from a study of Figs. 2, 3, 4 and 5.

Figure 2:
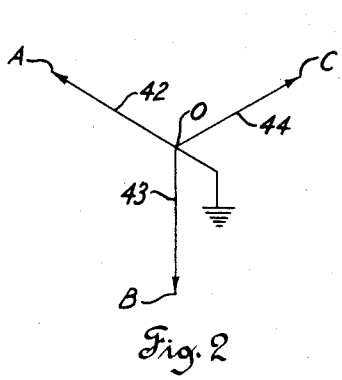
Fig. 2 is a schematic vector diagram illustrating the normal relationship of the voltages induced across the secondary windings of a wound rotor motor.

In Fig. 2, the vectors 42, 43, and 44 represent the normal voltages induced across the elements 15, 16 and 17 of the variable resistance in the secondary circuit of the wound rotor motor.

In Fig. 2, the vector 42 represents the voltage across the resistance element 15. The voltage across resistance 16 is shown as vector 43 and vector 44 represents the voltage across resistance 17. From a comparison of Figs. 1 and 2, it is evident that the potential at point A in the circuit diagram of Fig. 1 corresponds to the terminal point A in the vector diagram of Fig. 2. It follows that the potentials at points B and C in Fig. 1 correspond to the terminal points B and C in the vector diagram of Fig. 2. The neutral point of Fig. 2, designated as O, corresponds to O and conductor 40 in Fig. 1.

Figure 3:
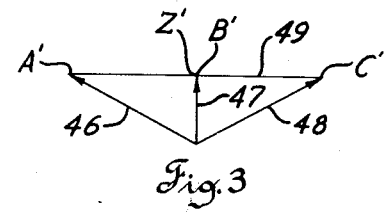
Fig. 3 is a vector diagram showing the relationships of various voltages induced across portions of the circuit of the invention for the condition shown in Fig. 2.

The vector diagram of Fig. 3 represents the potentials induced across the secondary windings 22, 25 and 28 of transformers 21, 24 and 27. Vector 46 represents the potential across the secondary winding 22 of transformer 21. Vector 48 represents the potential across the secondary winding 28 of transformer 27. The phase of vector 46 is the same as vector 42 and the phase of vector 48 is the same as vector 44. Since transformers 21 and 27 have the same ratio between the primary and secondary windings the vectors 46 and 48 will be equal in magnitude if vectors 42 and 44 are equal in magnitude.

Vector 47 is responsive to vector 43 but is shifted 180 degrees in phase due to the reversal of secondary winding 25 of transformer 24 with relation to primary winding 23. Transformer 24 has a different ratio between the primary and secondary windings so that for equal voltages across the primary windings 20, 23 and 26, the secondary winding 25 of transformer 24 has one-half the potential that appears across windings 22 and 28. This may easily be seen by comparing vector 47 with vector 43.

In Fig. 3 the terminal points A', B' and C' of vectors 46, 47 and 48 correspond to the potentials at the points A', B' and C' in Fig. 1. With reference to Fig. 1, the potential difference between point A' and point C' is divided in half at the point Z' common to resistors 37 and 38. This is shown in Fig. 3 where Z' is halfway between the terminal points A' and C'. Since vectors 46 and 48 are equal in magnitude and vector 47 bisects the 120 degrees angle between them, it follows that the point B', which is the terminal point of vector 47, will coincide with point Z' when vector 47 is one-half the magnitude of the vectors 46 and 48. Thus, for the condition of phase balance there will be no potential difference across the alternating current terminals 32 and 33 of rectifier 31 and no current will flow through the circuit breaker trip coil.

Figure 4:
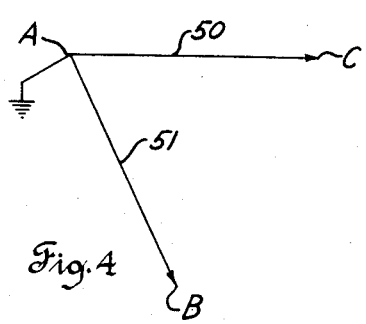
Fig. 4 is a schematic vector diagram illustrating the voltage relationships in the secondary of the motor when one phase is missing.

Fig. 4 is illustrative of the condition where the potential of phase A has been reduced to zero through some kind of fault. The voltage of the remaining phases will assume the relationship shown in Fig. 4. Vector 44 changes to vector 50 under these conditions and vector 43 changes to vector 51 while vector 42 has decreased to zero.

Figure 5:
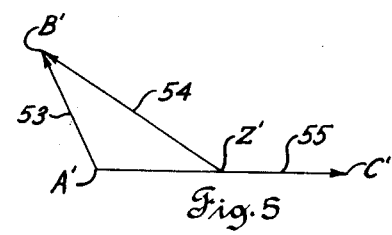
Fig. 5 is a schematic vector diagram illustrating the relationship of voltages at various points of the protective circuit for the condition illustrated in Fig. 4.

Resistors 37 and 38 are energized by the difference in potential between point A' and C'. A study of Fig. 5 shows that this potential will be the same as it was for the normal condition. Although the potential of phase A has fallen to zero the potential difference between phases A and B remains the same. The situation with regard to phase B is changed from the normal condition in both magnitude and direction. Reversing the phase of vector 51 and reducing the relative magnitude by one-half results in the vector 53 of Fig. 5. The terminal point B' of this vector coincides with the midpoint Z' of vector 49 in the balanced condition shown in Fig. 3. In the unbalanced condition the midpoint Z' of vector 55 is displaced from the terminal point B' by the vector 54. It is this voltage which appears across terminals 32 and 33 of rectifier bridge 31. The resulting direct current output between terminals 34 and 35 energizes the trip coil 12 to open the circuit breaker and disconnect the motor from the remainder of the circuit.

It is obvious that, while but one condition of phase unbalance has been described, other unbalanced conditions will also produce the same result. Any condition which results in a substantial displacement of the terminal point B' from the midpoint Z' will result in the circuit breaker being tripped.

While but one embodiment of our invention has been shown and described it will be obvious to those skilled in the art that various changes and modifications may be made therein without departing from the spirit of the invention and scope of the appended claims.

What is claimed is:

1. In a circuit having a three legged Y-connected load, circuit means for deriving a first voltage responsive in phase and magnitude to the current through one leg of said load, means for shifting the phase of said first voltage, circuit means for deriving second and third voltages responsive respectively, in phase and magnitude, to the current through second and third legs of said load, means for combining said third voltage and a portion of the difference between said second and third voltages, electroresponsive means energized by the difference between said combined voltages and said first voltage whereby an output is produced when the currents in the three legs of said load are unbalanced.

2. In a circuit having a three legged Y-connected load, switch means for disconnecting said load, circuit means for deriving a first voltage responsive in phase and magnitude to the currnet through one leg of said load, means for shifting the phase of said first voltage, circuit means for deriving second and third voltages responsive respectively, in phase and magnitude, to the current through the second and third legs of said load, means for combining said third voltage and a portion of the difference between said second and third voltages, electroresponsive means energized by the difference between said combined voltages and said first voltage to produce an output when the currents in the three legs of said load are unbalanced, operating means for said switch means, means connecting said operating means to be responsive to said output to open said switch when the currents in the three legs of said load are unbalanced.

3. In a circuit having a three legged Y-connected load, switch means for disconnecting said load, control means for said switch means comprising: circuit means for deriving a first voltage responsive in phase and magnitude to the current through one leg of said load, means for shifting the phase of said first voltage, circuit means for deriving second and third voltages responsive respectively, in phase and magnitude, to the current through the second and third legs of said load, means for combining said third voltage and a portion of the diffrence between said second and third voltages, rectifier means having input terminals and output terminals, circuit means connecting said input terminals to be energized by the difference in potential between said first voltage and said combined voltages, operating means for opening said switch means, means connecting said operating means to said rectifier output terminals to open said switch and disconnect said load when the currents in the three legs of said load are unbalanced.

4. In a circuit having a three legged Y-connected load, switch means for disconnecting said load, control means for operating said switch means in response to unbalanced currents through the legs of said load comprising: a plurality of transformers having primary and secondary windings, means connecting said primary windings in a Y-circuit relation so that each primary winding is energized by a voltage responsive, in phase and magnitude, to the current in a separate leg of said load, means connecting said secondary windings in a Y-circuit relation with a first of said secondary windings reverse in polarity, impedance means interconnecting a second and third of said secondary windings so as to be energized by a voltage proportional to the vector difference between the voltages across said second and third secondary windings, electroresponsive means, circuit means connecting said electroresponsive means between said first secondary winding and a point on said impedance means whereby said electroresponsive means is energized by a voltage proportional to the difference between the potential of said point and the potential across said first secondary winding, said switch means being connected to said electroresponsive means to be actuated by the output thereof.

5. In a circuit having a three legged Y-connected load, switch means for disconnecting said load in response to unbalance currents through the legs of said load comprising: a plurality of transformers having primary and secondary windings, means connecting said primary windings to said load in a Y-circuit relation so that each primary winding is energized by a voltage responsive, in phase and magnitude, to the current in a separate leg of said load, means connecting said secondary windings in a Y-circuit relation with a first of said secondary windings reversed in polarity, impedance means, means connecting the extremities of a second and third of said secondary windings to said impedance means so as to have impressed across said impedance means a voltage proportional to the vector difference between the voltages across the second and third secondary windings, rectifier means having input terminals and output terminals, means connecting one of said input terminals to the extremity of said first secondary winding, means connecting another of said input terminals to an intermediate point on said impedance means so as to energize said rectifier means with a voltage proportional to the difference between a first voltage proportional to the sum of the voltage across said second secondary winding and a portion of the voltage across said impedance means and a second voltage proportional to the voltage across said first secondary winding, control means for said switch means, means connecting said control means to said rectifier output terminals to actuate said switch means and disconnect said load in response to unbalanced currents flowing in the legs of said load circuit.

6. In a protective device for a polyphase load, a switch for disconnecting said load, a plurality of transformer means each having a primary and a secondary winding, means connecting each of said primary windings to be energized by a voltage responsive to the current flowing through a separate portion of said load, means connecting said secondary windings in a Y relationship with a first of said secondary windings reversed in phase, impedance means interconnecting a second and third of said secondary windings to be energized by the difference in potentials across said second and third secondary windings, means connecting electroresponsive means to be energized by the potential difference between the potential across said first secondary winding and the potential of an intermediate point on said impedance means relative to the neutral point of said Y-connected secondary windings, said switch being connected to said electroresponsive means to be actuated by the output thereof.

7. In a three phase circuit having a three legged Y-connected load, a plurality of transformers having primary and secondary windings, means connecting said primary windings to said load in a Y-circuit relation so that each primary winding is energized by a voltage responsive, in phase and magnitude, to the current flowing in a separate leg of said load, means connecting said secondary windings in a Y-circuit relation with a first of said secondary windings reversed in polarity, impedance means, circuit means connecting said impedance means to be energized by the potential difference between the extremities of said second and third secondary windings, electroresponsive means, circuit means connecting said electroresponsive means to be energized by the difference in potential between the extremity of said first secondary winding and a point on said impedance means whereby said electroresponsive means provides an output signal when the currents through the legs of said load are unbalanced.

References Cited in the file of this patent

UNITED STATES PATENTS

| 1,816,729 | Grassot | July 28, 1931 |
| 1,929,059 | Fitzgerald | Oct. 3, 1933 |

FOREIGN PATENTS

| 569,028 | Great Britain | May 1, 1945 |